INVENTORS
Clark K. Benson
Andrew A. Curidis
Attorneys

INVENTORS
Clark K. Benson
Andrew A. Caridis
BY
Attorneys

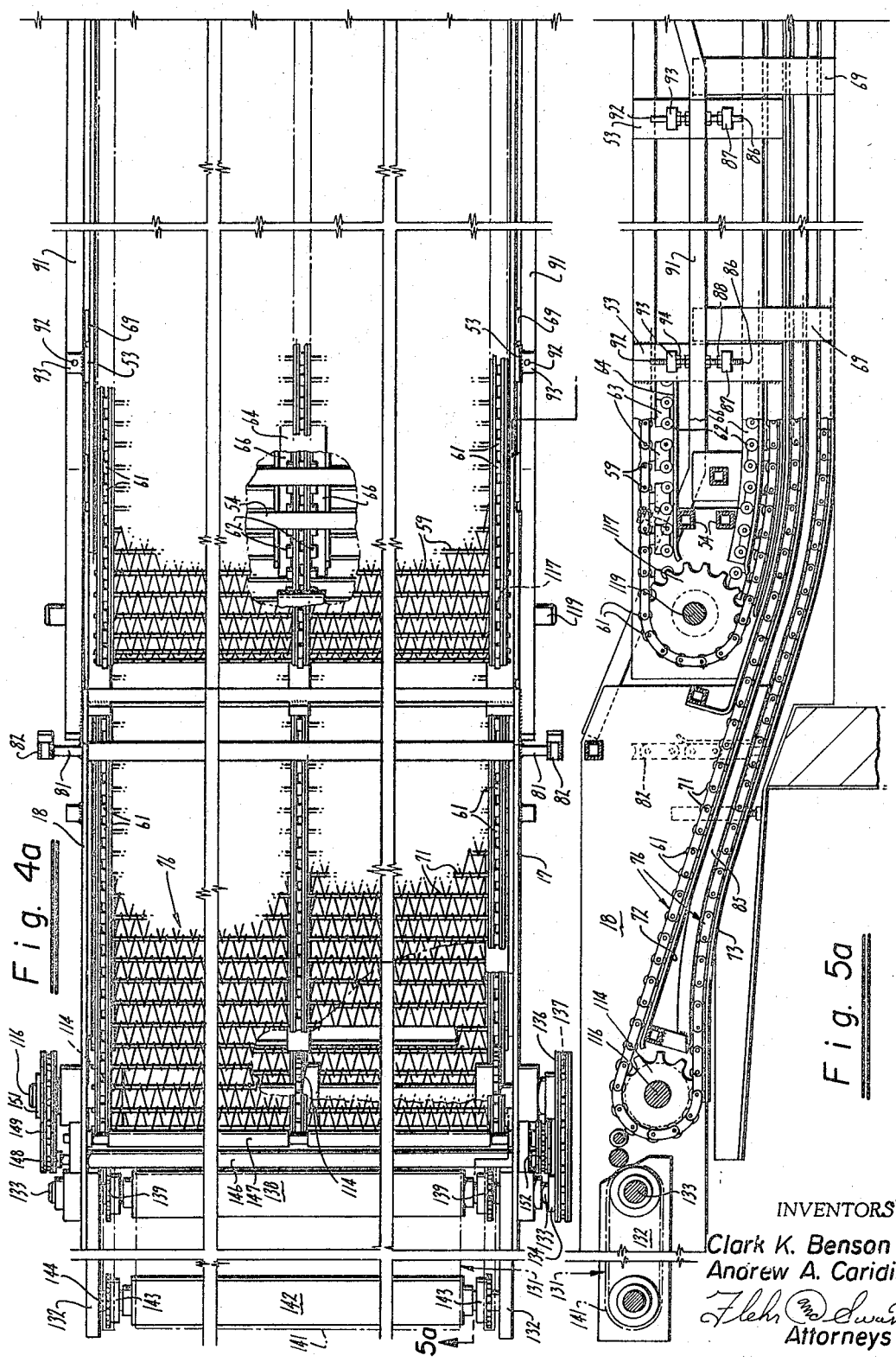

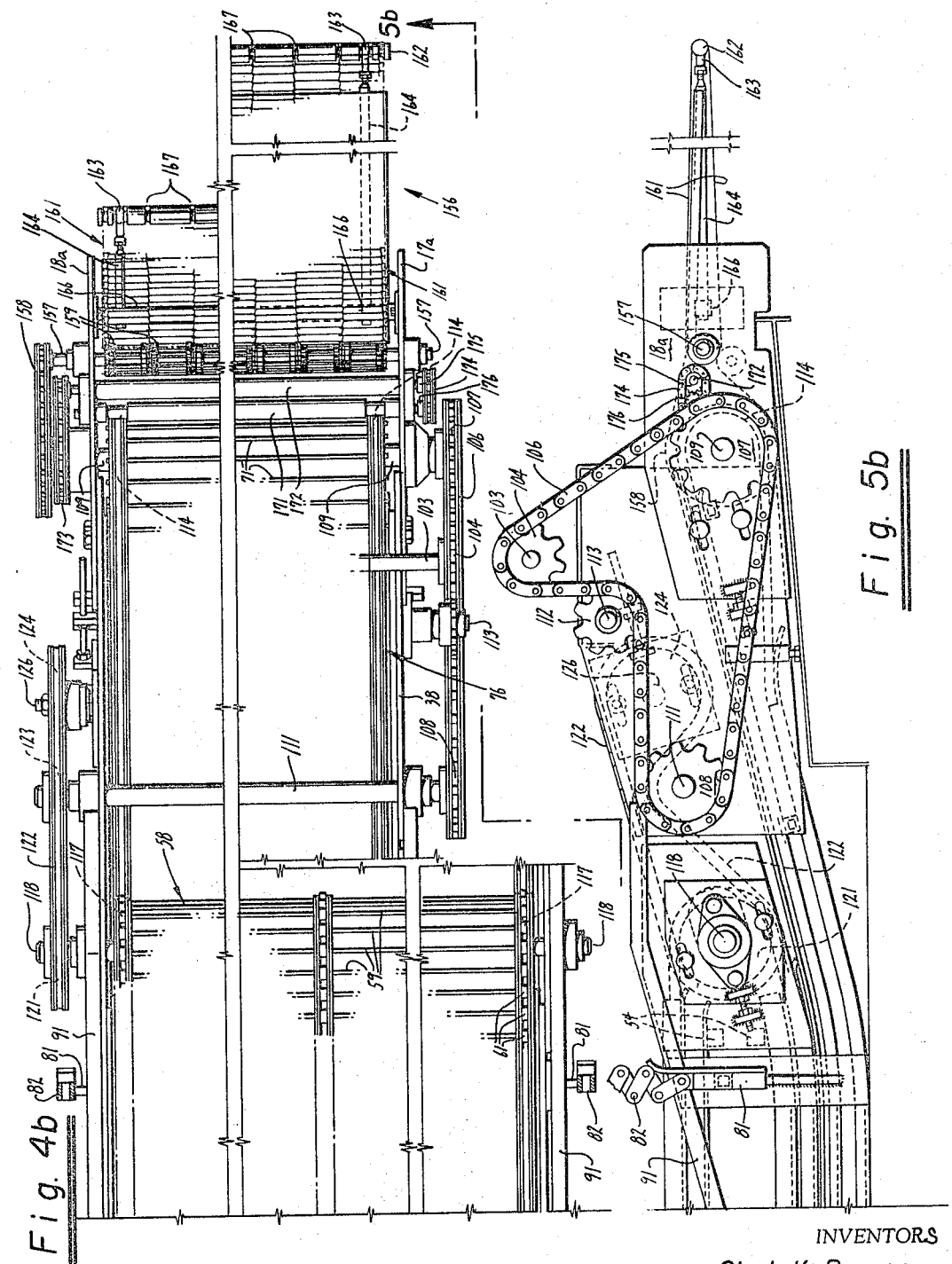

United States Patent Office 3,309,981
Patented Mar. 21, 1967

3,309,981
FOOD COOKER
Clark K. Benson and Andrew A. Caridis, both of Millbrae, Calif., assignors to Heat and Control, Incorporated, San Francisco, Calif., a corporation of California
Filed July 6, 1965, Ser. No. 469,685
9 Claims. (Cl. 99—405)

This invention relates to a food cooker and more particularly a food cooker for cooking pies and other food products.

The cooking of turnover pies and other products in conventional cookers is not completely satisfactory because the production capacity of such cookers is limited and also because it is difficult to obtain uniformty in cooking of the products. Also, with conventional cookers, it has been difficult to obtain a uniform color in the cooked product. There is, therefore, a need for a new and improved food cooker.

In general, it is an object of the present invention to provide a food cooker which overcomes the above named disadvantages.

Another object of the invention is to provide a food cooker of the above character which has a very high production capacity.

Another object of the invention is to provide a food cooker of the above character in which it is possible to obtain better uniformity in cooking of the product.

Another object of the invention is to provide a food cooker of the above character in which it is possible to achieve a uniform color on the cooked product.

Another object of the invention is to provide a food cooker of the above character in which the product, as it is being cooked, is submerged in the cooking oil.

Another object of the invention is to provide a food cooker of the above character in which the vertical spacing occupied by the product as is advances through the cooker can be adjusted.

Another object of the invention is to provide a food cooker of the above character which has a plurality of zones of control for cooking of the product.

Another object of the invention is to provide a food cooker of the above character in which a counterflow of cooking oil is provided adjacent the discharge end of the food cooker to facilitate obtaining of a uniform cook of the product.

Another object of the invention is to provide a food cooker of the above character in which the thickness of of the product as it is being cooked can be kept uniform.

Another object of the invention is to provide a food cooker of the above character in which the temperature of the oil in the cooking vat at the inlet end of the product can be readily adjusted to prevent blistering of the product.

Another object of the invention is to provide a food cooker of the above character which can be utilized for cooking various types of products.

Another object of the invention is to provide a food cooker of the above character in which it is unnecessary to have bearings and sprockets in the cooking oil.

Additional objects and features of the invention will appear from the following description in which the preferred embodiment is set forth in detail in conjunction with the accompanying drawings.

Referring to the drawings:

FIGURES 4a and 4b show a top plan view of the furnace shown in FIGURE 1.

FIGURES 5a and 5b show a cross-sectional view of the food cooker taken along the line 5A–5B of FIGURES 4a and 4b.

Figure 1:
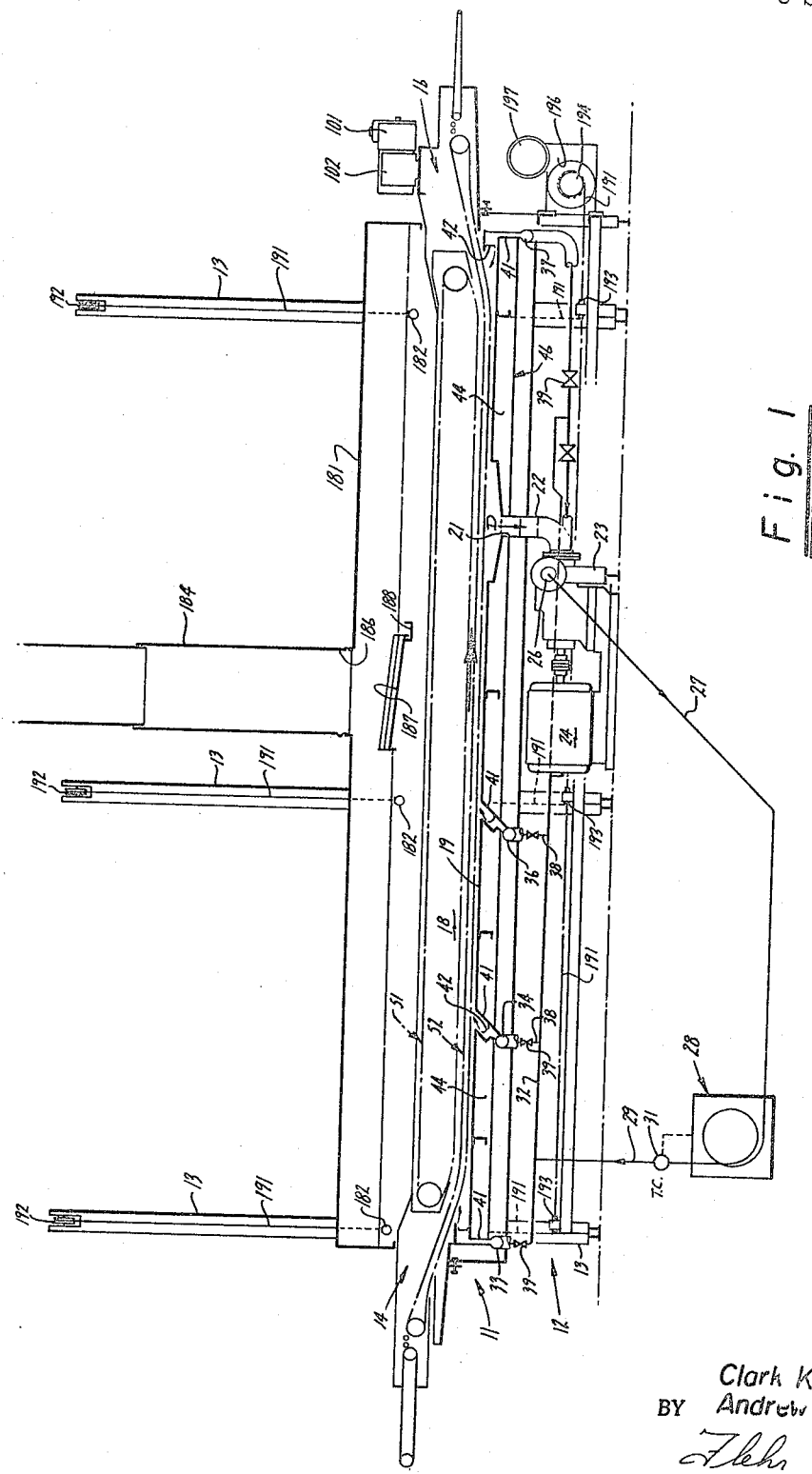
FIGURE 1 is a side elevational view, partially in schematic form, of a food cooker incorporating the present invention.

In general, the food cooker consists of a vat which has forward and rear ends and which is adapted to hold a quantity of cooking oil. A first conveyor is mounted in the vat and is adapted to receive the product and to advance the product through the vat in the oil in the vat. A second conveyor is mounted in the vat and overlies the first conveyor and serves to hold the product down in the oil in the vat as the product is advanced through the oil in the vat. Means is also provided for adjusting the vertical spacing between the first and second conveyors to thereby adjust the space available to the product as it passes through the vat. External heat exchanger means is provided for heating the oil. A drain is mounted in the vat intermediate the ends of the vat and means is provided which connects the drain to the heat exchanger means. Means is also provided for supplying oil from the heat exchanger means to the inlet end of the vat so that oil flows from the inlet end of the vat to the drain and back to the heat exchanger. Additional means is also provided for supplying oil from the heat exchanger means to the outlet end of the vat so that oil flows in the vat from the outlet end of the vat toward the drain in a direction substantially opposite the flow of oil from the inlet end of the vat toward the drain.

More particularly, as shown in the drawings, the cooker consists of a vat or kettle 11 which is mounted upon a framework 12. The framework 12 includes a plurality of vertical legs or standards 13, three of which are provided on each side of the vat. The vat 11 is provided with an inlet end 14 and an outlet or discharge end 16. The vat 11 is also provided with side walls 17 and 18 and a bottom wall 19. The bottom wall is provided with a depressed drain 21 which is disposed between the inlet and discharge ends. The drain 21 is connected to a drainpipe 22 which is connected to the inlet of a pump 23. The pump 23 is driven by an electric motor 24. The pump 23 is provided with an outlet 26 which is connected to piping 27. The piping 27 is connected to an external heat exchanger 28 which can be of a suitable type, such as a gas-fired heat exchanger. The heated oil, as it passes from the heat exchanger, passes through piping 29.

Means is provided for sensing the temperature of the oil as it leaves the heat exchanger 28 and consists of a temperature controller 31 of a suitable type such as a pneumatic proportioning controller manufactured by the Taylor Instrument Company and which is utilized for controlling the gas-fired burners of the heat exchanger. The heated oil from the piping 29 is supplied to a large pipe 32 extending longitudinally of the vat 11. The large supply pipe 32 is connected to four separate distribution manifolds 33, 34, 36 and 37 by riser pipes 38. The flow to each of the manifolds 33, 34, 36 and 37 is controlled by a separate manually controlled valve 39 provided in each of the pipes 38 so that the flow into the manifolds can be individually controlled. The manifolds 33, 34, 36 and 37 extend laterally across the vat 11 below the bottom of the vat. A plurality of outlet pipes 41 are mounted on each of the manifolds 33, 34, 36 and 37 which open into the bottom wall 19 of the vat 11. As also can be seen from FIGURE 1 of the drawings, the outlet pipes 41 are spaced apart laterally across the bottom wall of the vat. Deflector plates 42 are provided in the outlet pipes 41 to break up the flow of oil therefrom. The outlet pipes 41 connected to the manifold 33 extend upwardly and enter the inlet end of the vat 11. The manifold outlet pipes 41 are connected to the manifolds 34 and 36 and are also spaced apart laterally across the width of the vat 11 and, as shown in FIGURE 1, are inclined forwardly toward the discharge end of the vat. It also will be noted that the outlet pipes 41 for the manifolds 33, 34 and 36 are disposed on one side of the drain 21 so that the oil passing therefrom flows to the right as viewed in FIGURE 1 towards the drain. The outlet pipes 41 from the manifold 37 enter the discharge end of the vat 11 and also are spaced apart laterally across the width of the vat 11. It will be noted that the flow of oil from the outlet pipes 41 connected to the manifold 37 flows toward the drain 21 in a direction opposite the oil flows from the flows in the vat passing from the manifolds 33, 34 and 36 to in effect provide a counterflow of oil for a purpose hereinafter described.

The side walls 17 and 18 and the bottom wall 19 of the vat 11 are insulated with a suitable insulating material 44 such as glass wool. The insulating material 44 is enclosed within a rectangular housing 46 having a bottom wall 47 and side walls 48 mounted upon the framework 12.

Means is provided for advancing the product to be cooked through the cooking oil in the vat 11 and consists of an upper conveyor assembly 51 and a lower conveyor assembly 52. The upper conveyor assembly 51 includes a pair of spaced parallel, substantially vertical sideplates 53 which are fastened together by laterally extending cross bars 54. Angle-shaped members are secured to the side plates 53 to provide upper and lower side tracks 56 and 57 which carry the upper and lower runs of an endless conveyor 58. The endless conveyor 58 can be of any suitable type such as the wire mesh conveyor shown in the drawing which is provided with laterally extending cross rods 59, the ends of which carry rotatably mounted rollers 61 which are adapted to travel upon the upper and lower tracks 56 and 57 as shown particularly in FIGURE 3 of the drawings.

In particularly wide vats 11, it is desirable to provide additional means for supporting the conveyor intermediate the ends thereof. For this purpose, additional rollers 62 have been provided which are carried by brackets 63 mounted on the rods 59 intermediate the ends of the rods 59. The rollers 62 travel upon an upper plate 64 which is mounted upon the upper cross bars 54 and upon angle members 66 secured to the lower cross bars 54 by brackets 67. Thus, the plate 64 forms the upper track whereas the members 66 form the lower track for the rollers 62. If desired, additional supporting means can be provided for the conveyor 58 similar to that described for supporting the intermediate portions of the conveyor can be provided.

The lower conveyor assembly 52 consists of spaced parallel vertical side plates 69 which are fastened together by cross bars 71. Angle members are secured to the side plates 69 to provide upper and lower tracks 72 and 73, respectively. A conveyor 76 of a suitable type is mounted upon the lower conveyor frame 52 and is similar to the conveyor 58. Thus, the conveyor 76 can be of the wire mesh type with laterally extending rods 77 having rollers 78 rotatably mounted on the ends thereof and travelling upon the upper track 72 and the lower track 73. Brackets 81 are secured to the side plates 69 and are connected to chains 82 which are secured to a cross member 83 forming a part of a hood assembly as hereinafter described.

Figure 3:
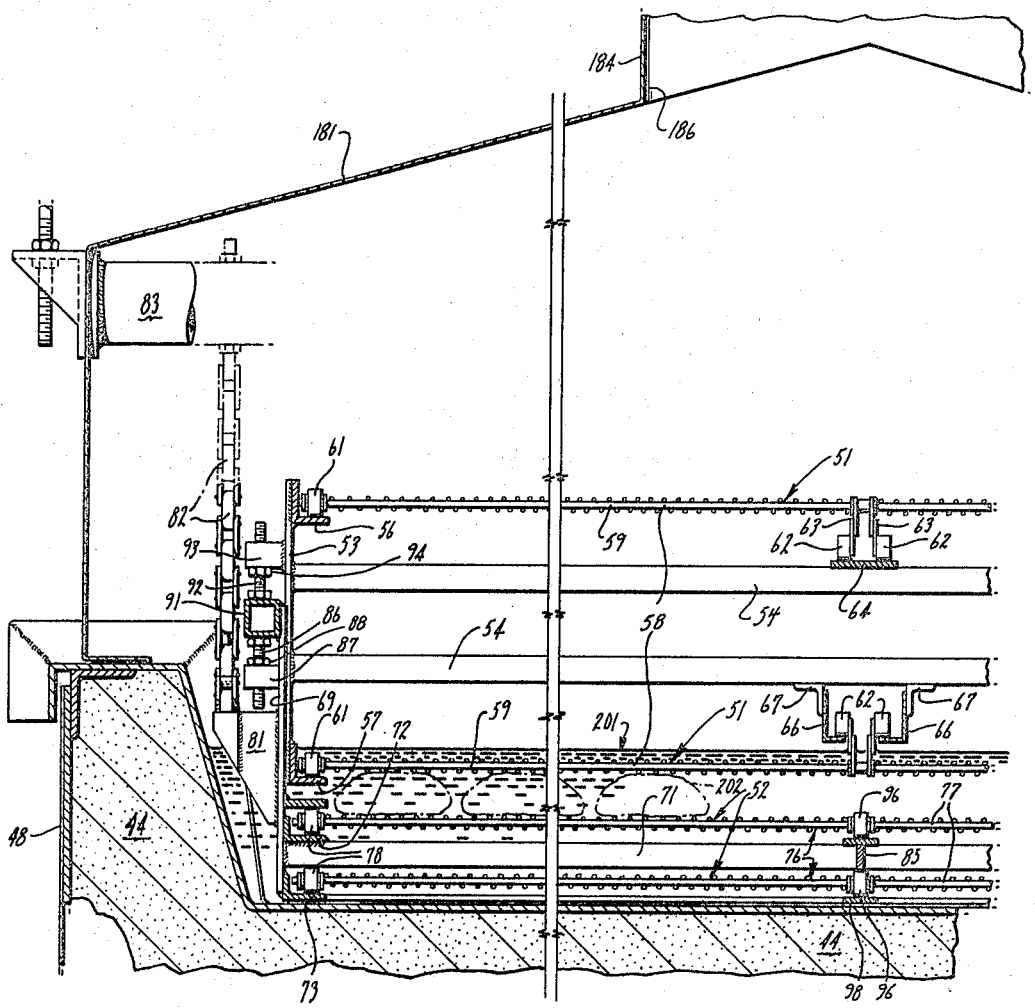
FIGURE 3 is an enlarged view showing a portion of the food cooker shown in FIGURE 2.
Figure 6:
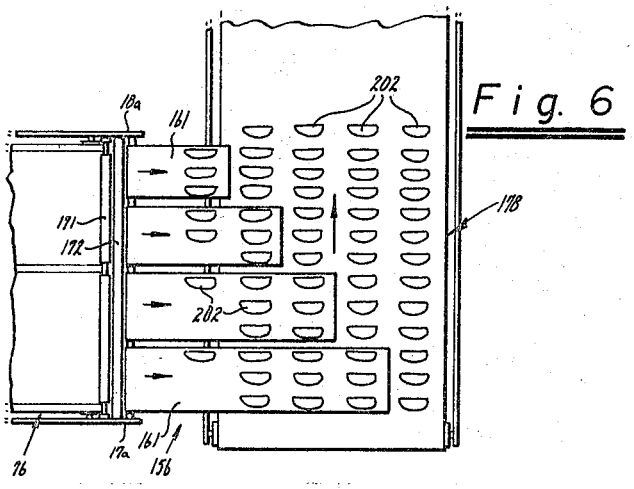
FIGURE 6 is a top plan view of the discharge end of the food cooker.

It will be noted from FIGURE 3 that the upper conveyor assembly 51 can be telescoped within the lower conveyor assembly 52. Means is provided for adjusting the position of the upper conveyor assembly 51 relative to the lower conveyor assembly 52 so that the desired amount of space for the product to be cooked can be provided between the lower run of the upper conveyor 58 and the upper run of the lower conveyor 76. As shown in the drawings, this means consists of cap screws 86 threaded into support members 87 mounted on the side plates 53 of the upper conveyor assembly 51 (see FIGURE 5a). Nuts 88 are provided on the cap screws for locking the cap screws in the desired position. The heads of the cap screws 86 engage the lower surfaces of longitudinal members 91 secured to the upper part of the side plates 69 of the lower conveyor assembly 52 and which extend longitudinally thereof. Additional cap screws 92 are provided which have their heads engaging the upper surface of the support members 91 and face in a direction opposite that of the screws 86. The cap screws 92 are threaded into support members 93 which are secured to the side plates 53. Nuts 94 are threaded on the cap screws and are provided for locking the cap screws 92 in place.

It can be seen that by adjustment of the cap screws 86 and 92, the vertical positioning of the upper and lower conveyor assemblies 51 and 52 can be adjusted. In addition, because of the construction shown, it can be seen that both the upper and lower conveyor assemblies 51 and 52 with the conveyors mounted thereon can be raised as a unit by the chains 82 as hereinafter described.

As hereinbefore described in conjunction with the conveyor 58, additional means can be provided for supporting portions of the lower conveyor 76 intermediate its ends. As shown particularly in FIGURE 3, such means consists of rollers 96 rotatably mounted upon the rods 77. The rollers 96 on the upper run of the conveyor 76 engage a T-shaped member 97 secured to the crossbar 71, whereas the rollers 96 and the lower run travel upon a plate 98 mounted onto the bottom wall 19 of the vat 11.

Means is provided for driving the upper conveyor 58 and the lower conveyor 76 and consists of an electric drive motor 101 which is mounted on a variable speed reducer 102. The speed reducer 102 drives a shaft 103 (see FIGURE 4b). The shaft 103 drives a sprocket 104 which drives an endless chain 106. The endless chain drives a sprocket 107 and a sprocket 108. The sprocket 107 drives a shaft 109 and the sprocket 108 drives a shaft 111. After passing from the sprocket 108, the chain 106 passes under an idler sprocket 112 that is mounted upon a stud shaft 113 affixed to side wall 38.

The lower conveyor 76 is mounted upon a plurality of sprockets 114 which are adapted to engage the rollers 78. Three of the sprockets (not shown) are mounted on the shaft 109 with two of the sprockets being adjacent the ends of the shaft and the other of the sprockets being intermediate the ends of the shaft assembly. Three of the sprockets are mounted on a shaft 116 at the other end of the conveyor 76 (see FIGURE 5a). Similarly, the upper conveyor 58 is mounted on a plurality of sprockets 117 at opposite ends of the conveyor. Three of the sprockets (not shown) are mounted on a shaft 118 and three additional sprockets 117 are mounted on the shaft 119. The sprockets are adapted to engage the rollers 61 as shown in FIGURE 4a. The shaft 118 is driven by a sprocket 121 which is driven by a chain 122. The chain 122 is driven by a sprocket 123 and passes over another sprocket 124. The sprocket 123 is mounted on the shaft 111 and driven thereby. As can be seen from FIGURE 5b, the sprocket 123 is positioned so that it is below both the upper and lower runs of the chains so that the chain is driven in an opposite direction in which the chain 106 is driven. The sprocket 124 is mounted on a stud shaft 126.

It will be noted that the sprockets 107 and the shaft 109 are mounted so that they can be shifted to tighten the lower conveyor 76. Similarly, the sprocket 121 and the shaft 118 are mounted so that they can be shifted to tighten the upper conveyor 58. The sprocket 112 can be shifted for tightening the chain 106, whereas the sprocket 124 can be shifted for tightening the chain 122.

From the foregoing, it can be seen that means has been provided for driving the upper and lower conveyors 56 and 76 in such a direction so that the lower run of the upper conveyor and the upper run of the lower conveyor are moving in the same direction in the vat 11 for advancing the product through the vat as hereinafter described.

Means is provided for introducing product into the vat 11 and consists of a loading conveyor 131 which consists of spaced parallel side frame members 132. The side frame members 132 are pivotally connected to the vat 11 to permit the outer ends of the same to be raised and lowered with respect to the vat. This is accomplished by the use of the shaft 133 which extends through the side frame members 132 and the side walls 17 and 18 of the vat 11. The shaft is driven by a sprocket 134 which is driven by a chain 136. The chain 136 is driven by a sprocket 137 which is mounted on one end of the shaft 116 for the lower conveyor 76. A large roller 138 and a pair of sprockets 139 are mounted on the shaft 133 and are utilized for driving a suitable conveyor such as a wire mesh conveyor 141. The conveyor 141 travels on the side frame members 132 over a roller 142 and sprockets 143 mounted on a shaft 144 rotatably mounted in the side frame members 132. With this arrangement, it can be seen that the outer end of the loading conveyor 131 can be raised and lowered while the same is still being driven to accommodate the various heights of individuals loading the conveyor 131.

Means is provided for transferring product from the loading conveyor 131 to the bottom conveyor 76 and consists of a pair of transfer rollers 146 and 147 which are rotatably mounted in the side walls 17 and 18 of the vat 11. The transfer roller 146 is driven by a sprocket 148 which is driven by a chain 149. The chain 149 is driven by a sprocket 151 mounted on the shaft 116. The transfer roller 146 drives a sprocket (not shown) which drives a chain 152 which drives another sprocket (not shown) mounted on the transfer roller 147. With this drive arrangement, it can be seen that as the lower conveyor 76 is advanced, the transfer rollers 146 and 147 and the loading conveyor 131 will be operated.

Means is provided for discharging the product after it has been cooked from the discharge end of the vat 11 and consists of an unloading conveyor assembly 156. The unloading conveyor assembly consists of spaced parallel side plate extensions 17a and 18a which are extensions of the side plates 17 and 18 of the vat 11. A shaft 157 is rotatably mounted in the side plates 17a and 18a. The shaft 157 is driven by a sprocket (not shown) which is driven by a chain 158 driven by a sprocket (not shown) secured to the shaft 109. A plurality of conveyor belt driving sprockets 159 are mounted on the shaft 157. A plurality of conveyor belts 161 are mounted on the sprockets 159 and are driven thereby.

In the embodiment of the food cooker shown in the drawings, four separate conveyor belts 161 are provided which have varying lengths with the uppermost conveyor belt 161 as viewed in FIGURE 5b being the shortest and with the other conveyor belts 161 being progressively longer. The conveyor belts 161 can be of any suitable type such as one formed of interwoven wires as shown in the drawings. The outer ends of the conveyor belts 161 are supported by shafts 162 which are rotatably mounted in bearing members 163. The bearing members 163 are threaded onto links 164 which are secured to a cross rod 166. The cross rod 166 is secured to the side plates 17a and 18a just forward of the shaft 157. The shafts 162 are provided with annular recesses 167 to accommodate the conveyor belts 161.

Means is provided for transferring the cooked product from the lower conveyor 76 to the unloading or discharge conveyor assembly 156 and consists of a pair of transfer rollers 171 and 172 which are rotatably mounted in the side plates 17a and 18a between the discharge end of the bottom conveyor 76 and the inlet end of the unloading conveyor assembly 156. The transfer roller 172 is driven by a sprocket (not shown) which is driven by a chain 173 that is driven by a sprocket 174 secured to the shaft 109. The transfer roller 172 drives a sprocket 175 which drives a chain 174 that drives a sprocket 176 secured to the transfer roller 171. Thus, it can be seen that as the lower conveyor 76 is operated, the unloading conveyor assembly 156 is operated as well as the transfer rollers 171 and 172.

Figure 2:
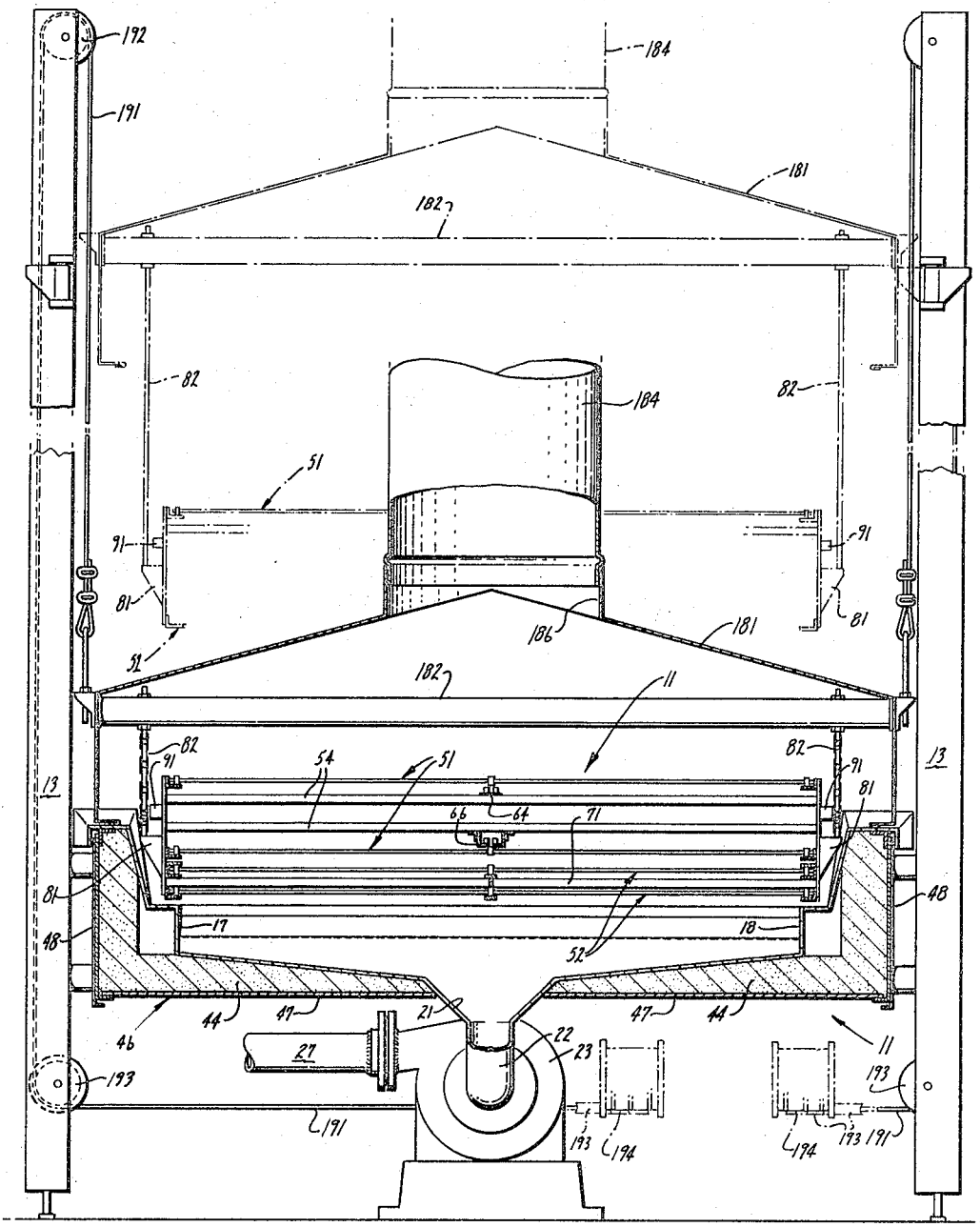
FIGURE 2 is a greatly enlarged cross-sectional view of the food cooker shown in FIGURE 1.

The food cooker also includes a hood 181 which is adapted to overlie the vat 11 and cover the same as shown in FIGURE 2. The hood is provided with cross members 182 which are connected by chains 82 to the upper conveyor frame 51. A telescoping stack 184 is connected to the hood and communicates with the area above the vat 11 through an opening 186. A drip pan 187 (see FIGURE 1) is mounted below the opening 186 and is adapted to collect condensate dripping from the stack 184 and deliver the same to a trough 188 also provided in the hood.

Means is provided for raising the hood and the upper and lower conveyor frames 51 and 52 and consists of cables 191 which are secured to the hood and received over pulleys 192 provided on top of the standards 13 and over pulleys 193 provided in the lower extremities of the standards 13. The cables 191 are also secured to hoist drums 194. The hoist drums 194 are driven by a speed reducer 196 and an electric motor 197 (see FIGURE 1).

Operation and use of our food cooker may now be briefly described as follows: let it be assumed that the food cooker is to be utilized for cooking a food product such as turnover pies and that the oil level within the cooker is slightly above the lower run of the upper conveyor 58 as shown by the level 201 in FIGURE 3. Also, let it be assumed that the oil has been heated to the desired temperature by the heat exchanger and the oil is maintained at a relatively constant temperature as, for example, at 385° F. by the temperature controller 31. Let it also be assumed that oil is being introduced at a controlled rate through the valves 39 and out the outlet pipes 41 so that there is a continuous flow of moving oil through the vat from the inlet end to the drain 21 and also from the discharge end to the drain 21.

The product to be cooked, as, for example, the turnover pies 202 is placed upon the loading conveyor assembly 131 by hand. However, if desired, it is readily apparent that the pies can be positioned thereon by automatic machinery.

As soon as the pies to be cooked are placed upon the loading conveyor 131, they are advanced by the loading conveyor onto the transfer rollers 146 and 147 which advance the pies onto the lower conveyor 76. As can be seen from FIGURE 5a, the pies, after they are advanced onto the lower conveyor 76, are advanced downwardly into the cooking oil. However, before the pies enter the cooking oil, the upper surfaces of the same are engaged by the lower run of the upper conveyor 58. This prevents the turnover pies from floating on the top surface of the oil, but ensures that they will be advanced downwardly into the oil and will be completely submerged in the oil. Thus, the upper conveyor 56 can be designated as a submerger or overhead conveyor. The spacing between the lower run of the upper conveyor and the upper run of the lower conveyor is adjusted to provide the desired spacing to accommodate the turnover pies. As pointed out previously, this adjustment is obtained by adjustment of the cap screws 86 and 92. In the cooking of the turnover pies, the adjustment is made so that no voids can be formed in the pies while they are being cooked in the oil. It should be appreciated however, that the vertical spacing should not be so small that undue pressure is applied to the pies to cause them to burst while they are being cooked. The vertical adjustment of the upper and lower conveyors 58 and 76, with respect to each other also makes it possible to obtain turnover pies having a uniform thickness.

The product being cooked, as, for example, the turnover pies, is advanced from the inlet end to the discharge end of the vat 11. During the time that the pies are passing through the food cooker, they are, in effect, being passed through four separate treatment zones which correspond to the areas extending longitudinally of the vat 11 between the four sets of pipes 41 for the heated oil from the heat exchanger 28. As pointed out previously, the temperature controller 31 maintains the oil from the heat exchanger 28 entering the distribution manifold or pipe 32 at a constant temperature.

In operation of the cooker, we have found that it is particularly desirable to be able to control the flow of the oil through the valves 39 and to thereby, in effect, control the temperature of the oil in the various zones. The product, as it is introduced in the inlet end, reduces the cooking oil in the inlet end of the vat 11 below the predetermined temperature for which the temperature controller 31 is set. It has been found that this is desirable because it reduces or completely eliminates blistering of the product as it enters the cooker. The temperature of the cooking oil in the inlet end can be readily controlled by increasing or decreasing the flow of oil into the inlet end. If necessary, a reduced flow of oil can also be provided in the second zone to prevent blistering of the product. Thus, by having a slightly lower temperature in the inlet end of the vat, it is possible to gradually increase the temperature of the product as it is advanced in the cooking oil so that it does not blister. In the third zone, the oil is generally quite close to the desired temperature so that the product is thoroughly cooked. In the fourth zone, between the drain and the discharge end of the vat, additional oil is introduced at the predetermined temperature which flows in an opposite direction, or, in other words, in a direction counter to the direction of travel of the product through the vat 11. We have found that this feature is particularly desirable in the food cooker because it makes it possible to precisely control the temperature at the discharge or finish end of the cooker. For this reason, it is possible to obtain a very uniform cook of the product and to obtain a relatively precise control of the color of the product, i.e., the degree of brownness of the product.

After the product has been uniformly cooked, it is advanced upwardly out of the cooking oil by the bottom conveyor 76 onto transfer rollers 171 and 172 which cause the product to be advanced onto the unloading conveyor assembly 156 consisting of the four separate conveyor belts 161 of different lengths which cause the product to be deposited in four separate but closely spaced rows on a conveyor 178 as shown in FIGURE 4b. This arrangement is particularly advantageous in that it takes the product from a relatively wide conveyor, namely the bottom conveyor 76, and delivers the same to a much narrower conveyor 178 which facilitates depositing the pies in appropriate containers as, for example, bakery trays.

The present food cooker is also advantageous in that it has very high cooking capacity with a relatively low oil system content. By the provision of separate control valves for each zone, the temperature in each zone can be readily controlled by controlling the flow of oil into the zone.

In addition, the food cooker is one which can be readily cleaned and maintained. Thus, as shown in FIGURE 2 of the drawings, the hood 181 and the upper and lower conveyor frames 51 and 52 can be raised out of the vat 11 to permit cleaning of the vat. With the construction shown, no bearings or sprockets are disposed in the cooking oil. This greatly facilitates maintenance and reduces wear on these parts.

It is apparent from the foregoing that we have provided a new and improved food cooker which is particularly adapted for cooking a food product with great uniformity. It should be appreciated that although the operation and use of the food cooker has been described as being useful in connection with the cooking of turnover pies, the food cooker can be readily used for other types of foods as, for example, chicken parts and the like.

Although the food cooker has been described with the use of only a single heat exchanger, it is readily apparent that, if desired, two or more separate heat exchangers and pump systems and returns can be utilized in place of the single pump and single return provided in the present food cooker.

We claim:

1. In a food cooker, a vat having inlet and discharge ends and adapted to hold a quantity of oil, a drain mounted in the vat intermediate the ends of the same and serving as the sole drain for the vat, external heat exchanger means for heating the oil in the vat, means connecting the drain to the heat exchanger, means for supplying oil from the heat exchanger to the vat so that oil flows from the inlet end of the vat to the drain and back to the heat exchanger, and means for supplying oil from the heat exchanger to the vat so that oil flows in the vat from the discharge end of the vat to the drain in a direction substantially opposite the flow of the oil from the inlet end of the vat.

2. A food cooker as in claim 1 together with conveyor means mounted in the vat for advancing the product through the vat from the inlet end to the discharge end of the vat.

3. A food cooker as in claim 1 together with a first conveyor mounted in the vat and adapted to receive the product and to advance the product through the oil in the vat from the inlet end to the discharge end, a second conveyor mounted in the vat and overlying the first conveyor and serving to hold the product down in the oil in the vat as the product is advanced through the oil in the vat.

4. A food cooker as in claim 3 together with means for adjusting the vertical spacing between the first and second conveyors to thereby adjust the space available for the product as it passes through the cooking oil in the vat.

5. A food cooker as in claim 3 together with a discharge conveyor assembly mounted on the discharge end of the vat, said discharge conveyor assembly comprising a plurality of separate endless discharge conveyors having different lengths, an additional endless conveyor underlying said separate endless discharge conveyors and adapted to receive the product from the separate endless discharge conveyors so that the product is deposited on the additional endless conveyor in a plurality of spaced rows.

6. In a food cooker, a vat having inlet and discharge ends and adapted to hold a quantity of oil, upper and lower conveyor assemblies for advancing product through the oil in the vat, a drain mounted in the vat intermediate the ends of the same and serving as the sole drain for the vat, and means for supplying heated oil to the vat so that the oil in the vat flows in the vat in two substantially opposite directions toward said drain, one of which is with the movement of the product in the vat and the other of which is opposite the movement of the product in the vat.

7. In a food cooker, a vat adapted to hold a quantity of oil, a first conveyor assembly mounted in the vat and adapted to receive a product and to advance the product through the oil in the vat, said first conveyor assembly comprising an endless conveyor, a framework disposed in the vat and mounting said endless conveyor, said framework including track means for supporting the upper run of the endless conveyor through substantially the entire length of the upper run of the endless conveyor, a second conveyor assembly mounted in the vat and overlying the first conveyor assembly and serving to hold the product down in the oil in the vat, said second conveyor assembly comprising an additional endless conveyor, an additional framework disposed in the vat and mounting said additional endless conveyor, said additional framework including additional track means for supporting the lower run of the additional endless conveyor through substantially the entire length of the lower run of the additional endless conveyor, said first named track means and said additional track means serving to guide the upper and lower runs of the first named and additional conveyors so that they travel in a substantially parallel planar spaced apart relationship through a substantial portion of the vat, and means for adjusting the vertical spacing between the first and second conveyor assemblies to thereby adjust the spacing between the upper run of the first named conveyor and the lower run of the additional conveyor.

8. A food cooker as in claim 7 wherein said means for adjusting the vertical spacing comprises a rigid member affixed to one of said frameworks and extending longitudinally of the vat, a plurality of pairs of threaded members mounted on the other of said plates, one threaded member of each pair engaging one side of the rigid member and the other threaded member of each pair engaging the other side of said rigid member.

9. A food cooker as in claim 7 in which said first named and additional frameworks each includes spaced parallel side plates, the side plates of the second conveyor assembly being movable in a telescoping relationship with respect to the side plates of the first conveyor assembly.

References Cited by the Examiner

UNITED STATES PATENTS

| 1,760,979 | 6/1930 | Ferry | 99—405 |
| 1,935,770 | 11/1933 | Elliott | 99—405 |
| 2,042,655 | 6/1936 | Ferry | 99—405 |
| 2,715,869 | 8/1955 | Salvo | 99—404 |
| 2,767,095 | 10/1956 | Smith. | |
| 2,812,254 | 11/1957 | Smith. | |
| 2,833,203 | 5/1958 | Benson et al. | 99—404 |
| 2,890,784 | 6/1959 | Barrett | 198—30 |

FOREIGN PATENTS 519,628   3/1931   Germany.

BILLY J. WILHITE, *Primary Examiner.*